United States Patent [19]

Yamamoto et al.

[11] Patent Number: 5,222,098
[45] Date of Patent: Jun. 22, 1993

[54] SPECTRUM SPREAD COMMUNICATION SYSTEM

[75] Inventors: Michio Yamamoto; Atsushi Hoshikuki, both of Mobara, Japan

[73] Assignee: Futaba Denshi Kogyo K.K., Mobara, Japan

[21] Appl. No.: 715,395

[22] Filed: Jun. 14, 1991

[30] Foreign Application Priority Data

Jun. 15, 1990 [JP] Japan .................. 2-155335

[51] Int. Cl.⁵ ............................... H04K 1/00
[52] U.S. Cl. ........................... 375/1; 380/34
[58] Field of Search ................... 375/1; 380/34

[56] References Cited

U.S. PATENT DOCUMENTS

| | | | |
|---|---|---|---|
| 4,759,034 | 7/1988 | Nagazumi | 375/1 |
| 4,922,506 | 5/1990 | McCallister et al. | 375/1 |
| 4,943,975 | 7/1990 | Kurihara et al. | 375/1 |
| 5,008,899 | 4/1991 | Yamamoto | 375/1 |
| 5,084,901 | 1/1992 | Nagazumi | 375/1 |

*Primary Examiner*—Tod R. Swann
*Attorney, Agent, or Firm*—Oblon, Spivak, McClelland, Maier & Neustadt

[57] ABSTRACT

A spectrum spread communication system capable of ensuring positive synchronization and improving error rate characteristics of data. At least one frequency is subject to hopping at an interval equal to one cycle of a DS signal during one cycle of frequency hopping and a cycle of changing-over of hopping is controlled depending upon an output signal of a correlation device, resulting in accomplishing synchronization.

5 Claims, 4 Drawing Sheets

SPECTRUM SPREAD COMMUNICATION SYSTEM

BACKGROUND OF THE INVENTION

This invention relates to a spectrum spread communication system, and more particularly to a hybrid spectrum spread communication system wherein a frequency hopping system and a direct spreading system are combined.

A spectrum spread communication system (hereinafter referred to as "SS communication system") is developed so as to be utilized in various communication fields such as communication for office automation, mobile communication, communication for remote control and the like and is partially put to practical use.

The SS communication system exhibits various advantages such as crosstalk-proof characteristics, interference- or noise-proof characteristics and the like, because it is adapted to spread a narrow-band signal to a wide-band signal. The SS communication system is generally classified into a frequency hopping (hereinafter referred to as "FH") system and a direct spread (hereinafter referred to as "DS") system.

Although the FH system is resistant to fading and interference because one bit information is dispersed into a number of frequencies, it has a disadvantage of causing a circuit structure therefor to be complicated.

On the contrary, the DS system exhibits an advantage of simplifying a circuit structure. However, it is disadvantageous in that it is inferior in fading characteristics to the FH system.

In view of the foregoing, a hybrid SS communication system wherein the above-described FH system and DS systems are combined is considered in order to utilize the advantages of both systems.

FIG. 4 is a block diagram showing a transceiver used in such a conventional hybrid SS communication system. In FIG. 4, a base band data signal $V_{B1}$ which is data for transmission is multiplied by a pseudo-noise (PN) code supplied from a pseudo-noise code generator 402 by means of a mixer 404 and then supplied to one of input sections of a mixer 403. The PN code is varied depending upon applications, a band or the like, and an M series code of tens to hundreds bits is generally used therefor. A frequency synthesizer 401 includes a plurality of signal sources different in frequency and is adapted to supply, to the other input of the mixer 403, an output signal of a hopping pattern in response to the PN code generated from the PN code generator 402 while changing over it successively. The mixer 403 makes multiplication between the signal from the mixer 404 and that from the frequency synthesizer 401 and subjects a multiplied signal thus obtained to FH, which is then transmitted from a transmission antenna 405.

The transmitted signal is received by a receiving antenna 406 and then supplied to one of inputs of a mixer 407. The mixer 407 makes multiplication between a signal 408 from a mixer 408 and the received signal and supplies a signal thus multiplied to a demodulator 411. The signal is then demodulated by the demodulator 411 and output in the form of a base band output signal $V_{BO}$ therefrom. The base band output signal $V_{BO}$ corresponds to the base band data signal $V_{B1}$ on the side of the transmitter.

A signal output from the demodulator 411 is supplied to a synchronous circuit 412. The synchronous circuit 412 functions to control a frequency of a PN code output signal generated from a PN code generator 410 so as to maximize the output signal of the demodulator 411. The PN code generator 410 may be constructed in the same manner as the PN code generator 402 on the side of the transmitter. The output signal of the PN code generator 410 is supplied to one of inputs of the mixer 408 and to a frequency synthesizer 409. The frequency synthesizer 409 may be constructed in the same manner as the frequency synthesizer 401 on the side of the transmitter and is adapted to successively supply, to the other input of the mixer, a plurality of frequency signals in the same pattern as that on the side of the transmitter in response to the PN code generated from the PN code generator 410. The mixer 408 multiplies signals supplied thereto from the frequency synthesizer 409 and PN code generator 410 and supplies a signal thus multiplied to the other input of the mixer 407. The mixer 407, as described above, mixes the signals supplied from the mixer 408 and receiving antenna 406 together and supplies a signal thus mixed to the demodulator 411.

When the above-described operation is repeated to cause the output signal of the demodulator 411 to be maximum, the synchronization of a hopping speed between the transmitter and the receiver is accomplished, so that the base band output signal $V_{BO}$ corresponding to the base band input signal $V_{B1}$ may be obtained. Thus, various kinds of data communication are made possible.

However, the conventional transceiver for the hybrid SS communication system described above employs a DLL (delay lock loop) circuit or the like as synchronism supplementing circuit and a synchronism holding circuit, so that much time is required to complete synchronization and it is highly difficult to establish complete synchronization.

Also, when low-speed hopping wherein information corresponding to one bit of base band data is subject to frequency hopping at one hop or less is carried out, interference often occurs in a certain portion of a frequency due to external noise or the like. This causes demodulation of data to be impossible in the whole frequency and the portion of the frequency which renders the demodulation impossible accounts for a relatively large part of the frequency, resulting in error rate characteristics being reduced.

SUMMARY OF THE INVENTION

The present invention has been made in view of the foregoing disadvantage of the prior art.

Accordingly, it is an object of the present invention to provide an SS communication system which is capable of accomplishing positive synchronization.

It is another object of the present invention to provide an SS communication system which is capable of improving error rate characteristics of data.

In accordance with the present invention, an SS communication system which is adapted to subject a direct spread signal based on data spread by a spread code to frequency hopping using different frequencies is provided. In the present invention, at least one frequency during one cycle of the frequency hopping is subject to hopping at an interval equal to one cycle of the direct spread signal, and synchronous holding of the frequency hopping is carried out according to a timing of correlation output at the time of hopping.

BRIEF DESCRIPTION OF THE DRAWINGS

These and other object and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, an SS communication system according to the present invention will be described hereinafter with reference to FIGS. 1 to 3.

Figure 2:
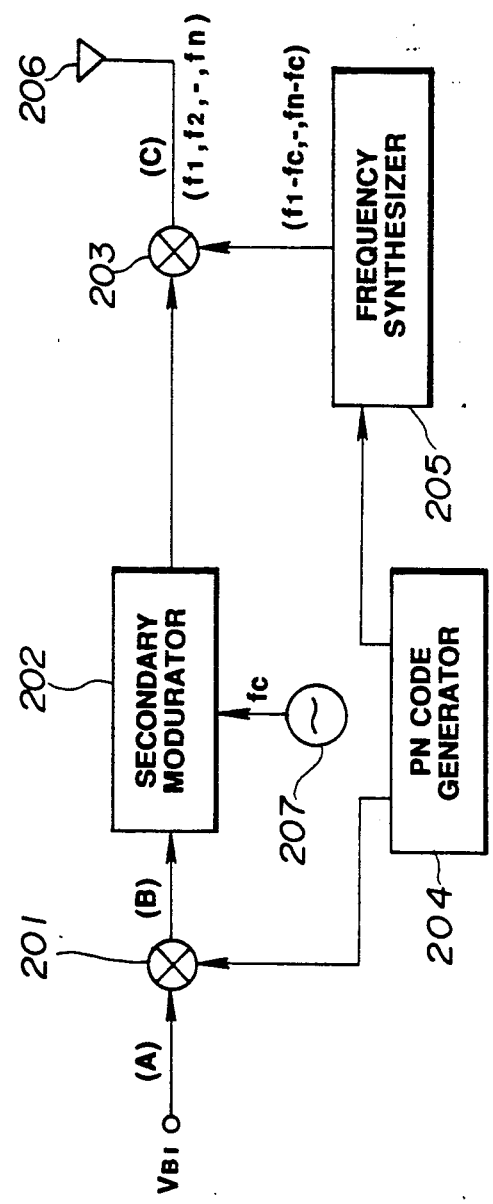
FIG. 2 is a block diagram showing a transmitter to which an SS communication system according to the present invention is applied.
Figure 3:
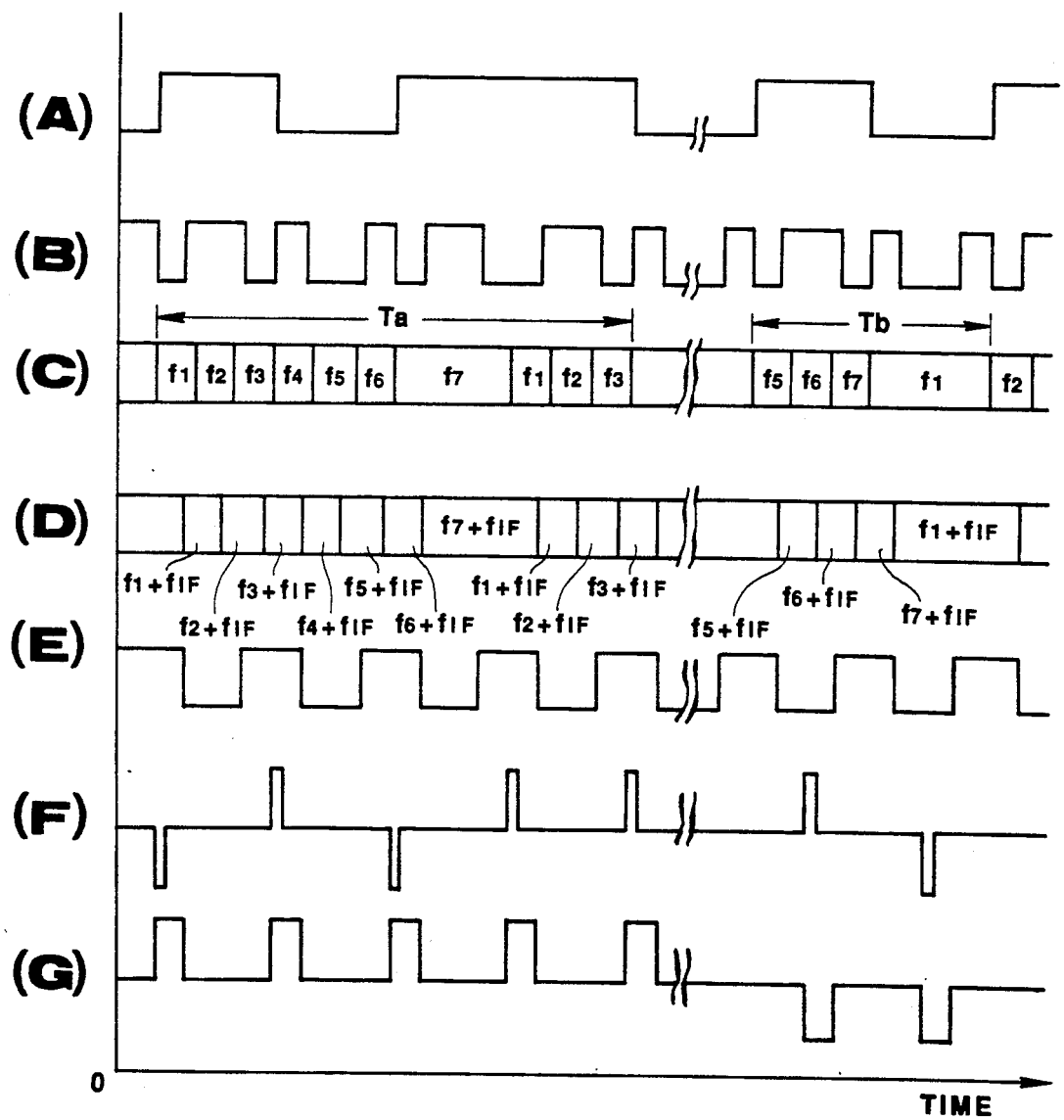
FIGS. 3(A-G) is a timing chart showing a timing at each portion of the receiver.
Figure 4:
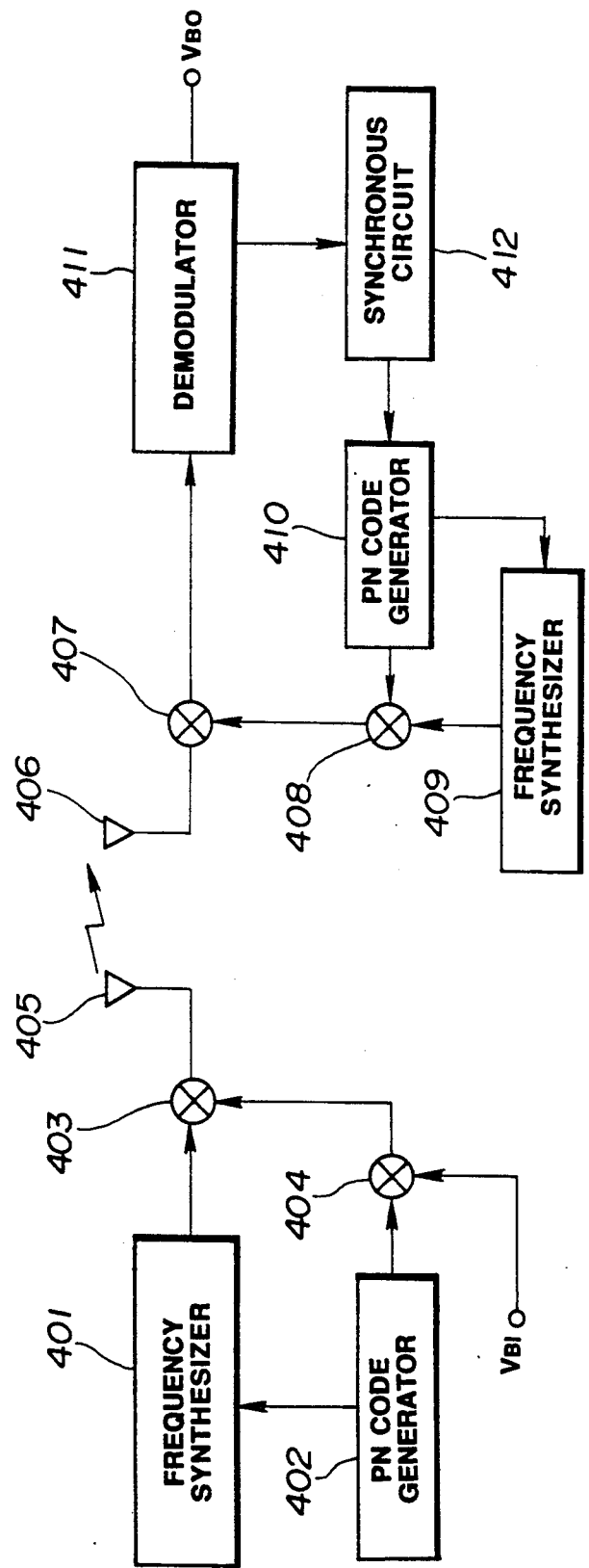
FIG. 4 is a block diagram showing a conventional transceiver.

FIG. 2 shows a transmitter for SS communication which is suitable for use in the present invention.

In FIG. 2, a base band data input signal $V_{BI}$ acting as data for transmission is supplied to one of inputs of a mixer 201 functioning as a mixing means. As the base band data input signal $V_{BI}$ may be used various kinds of communication data such as digital data indicating the amount of control of a stick in a radio control transmitter for a model or industrial applications, computer communication data, or the like. One unit of the base band data is constituted by a predetermined number of bits such as, for example, 16 bits. To the other input of the mixer 201 is supplied a PN code from a PN code generator 204. When a chip rate of the PN code and its length are indicated at $T_c$ and N, respectively, the cycle of the PN code is represented by $N \cdot T_c$, and these signals are multiplied by the mixer 201. This results in the base band data input signal $V_{BI}$ being spread depending upon the PN code and then supplied to a secondary modulator 202. The secondary modulator 202 is adapted to modulate a signal $f_c$ supplied from an AC signal source 207 using a signal supplied from the mixer 201 to convert it into a high frequency signal and then supplies it to one of inputs of a mixer 203 serving as a mixing means. As the modulator 202 may be used any suitable modulator such as a frequency shift keying (FSK) modulator, an amplitude modulator (AM), a phase-shift keying (PSK) modulator or the like.

The PN code generated from the PN code generator 204 is supplied to a frequency synthesizer 205. The frequency synthesizer 205 generates a plurality of different frequency signals $(f_1-f_c)$, $(f_2-f_c)$, ----, $(f_7-f_c)$ in response to the PN code successively while changing over them.

Now, a timing of frequency hopping will be described. Three frequencies are assigned to base band data of one unit as shown in FIG. 3, wherein, with respect to one cycle of hopping, one frequency is subject to hopping at an interval equal to one cycle of a direct spread signal generated from the secondary modulator 202 or at the same interval as the base band data of one unit. Thus, the interval of the frequency hopping is n (n: real number) times as large as one cycle of the direct spread signal and a timing of hopping is aligned with termination of one cycle of the PN code.

In the illustrated embodiment, seven kinds of frequencies $f_1$ to $f_7$ are used and any one of the frequencies $f_1$, $f_4$ and $f_7$ is subject to hopping at the same interval as the base band data of one unit. Also, the frequency is varied at every one cycle of the hopping to restrain it from being interfered.

Also, for a hopping sequence of one cycle of the hopping is used a code exhibiting a large random property such as, for example, a code of Reed-Solomon series or the like, resulting in the frequency being changed over randomly.

The output signal of the modulator 202 is subsequently subject to frequency hopping through the mixer 203 by means of the output signals $(f_1-f_c)$, $(f_2-f_c)$, ----, $(f_7-f_c)$ of the frequency synthesizer 205 and then transmitted from a transmission antenna 106.

In the illustrated embodiment, the frequency hopping or the like is carried out by means of the mixer 203. However, it may be conveniently carried out using any other suitable system such as, for example, a system of directly transmitting the output signal of the frequency synthesizer.

Figure 1:
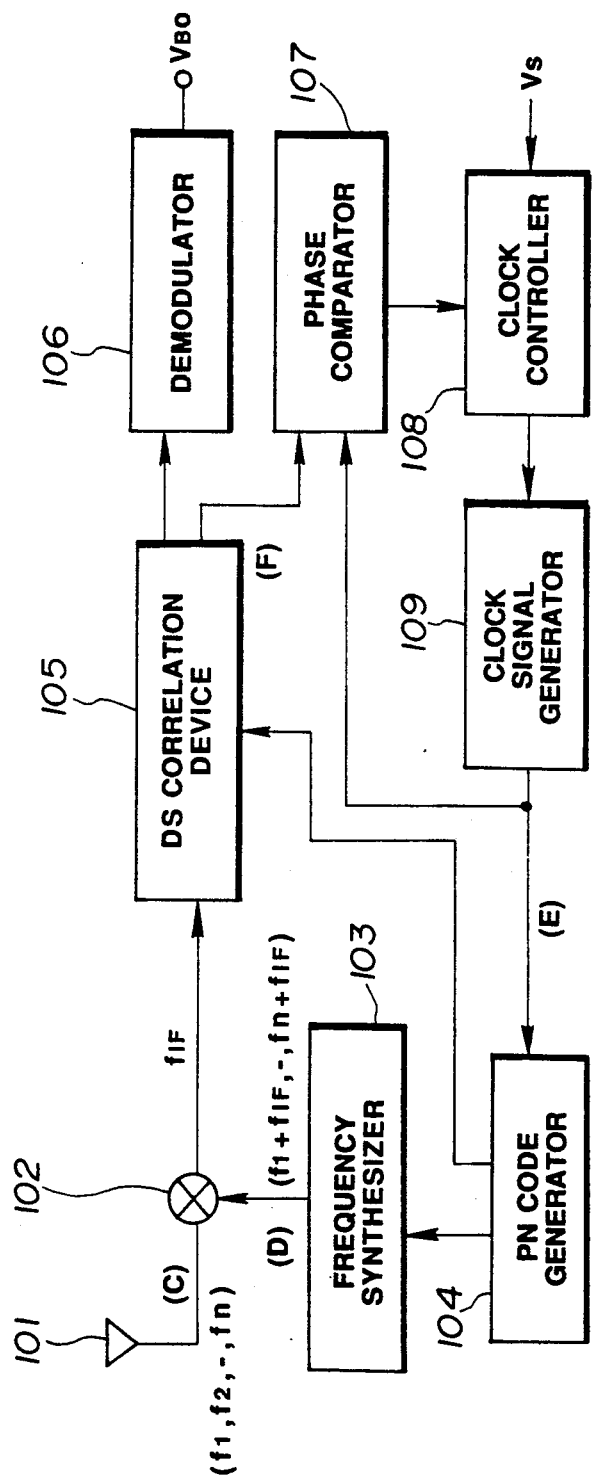
FIG. 1 is a block diagram showing a receiver to which an SS communication system according to the present invention is applied.

Referring now to FIG. 1, there is shown a receiver for the SS communication of the present invention. A signal transmitted from the transmitter shown in FIG. 2 is received by an antenna 101 and then supplied to one of inputs of a mixer 102 functioning as a mixing means.

The mixer 102 functions to multiply a signal supplied from a frequency synthesizer 103 acting as a frequency synthesizer means and the received signal described above to form a multiplied signal and subjects it to frequency conversion. Then, the mixer 102 supplies the signal to a DS correlation device 205. The frequency synthesizer 103 is constructed so as to generate a signal of the same hopping pattern as that generated from the frequency synthesizer 205 shown in FIG. 2 and subsequently supplies different frequency signals $(f_1+f_{1F})$, $(f_2+f_{1F})$, ----, $(f_7+f_{1F})$ to one of inputs of the mixer 102 in response to the PN code supplied from the PN code generator serving as a PN code generating means.

The PN code generator 104 is constructed in the same manner as the PN code generator 204 shown in FIG. 2 in connection with the length of a bit and the like, resulting in generating the same PN pattern. However, the PN code generator 104 is different from the PN code generator 204 in that the cycle is controlled by a clock signal generator 209 acting as a clock signal generating signal.

Also, the cycle of the DS signal and the changing-over cycle of the frequency synthesizer 103 are set to be n times (n: real number) at a synchronized state; however, these are constructed in the same manner as those on the side of the transmitter; therefore, in the illustrated embodiment, both are set to be the same cycle.

The correlation device 105 takes a correlation between the output signal of the mixer 102 and the PN code to generate a correlation signal. The correlation signal thus generated is supplied to a demodulator 106 serving as a demodulating means, as well as to one of inputs of a phase comparator 107 serving as a phase comparing means. The demodulator 106 is arranged in correspondence to the modulator 202 shown in FIG. 2 and adapted to demodulate a signal input thereto to generate a base band output signal $V_{BO}$ corresponding to the base band input signal $V_{BI}$ shown in FIG. 1.

The demodulator 106 is eliminated when the secondary modulator 202 is not provided on the side of the transmitter.

The phase comparator 107 functions to compares a phase difference between the correlation signal supplied from the correlation device 105 and a clock signal supplied from a clock signal generator 109 to supply a signal depending upon the difference to a clock controller 108 acting as a clock controlling means. The clock controller 108 supplies a clock control signal depending upon the input signal to the clock signal generator 109. To a control terminal of the clock controller 108 is input a forcing signal $V_S$ for synchronous supplementing. The clock signal generator 108 supplies a clock signal of a frequency depending upon the clock control signal to the PN code generator 104 and the other input of the phase comparator 107. The phase comparator 107, clock controller 108 and clock signal generator 109 cooperate together to constitute a control means.

Now, the manner of operation of the receiver of the illustrated embodiment constructed as described above will be described hereinafter with reference to FIGS. 1 to 3.

When a base band input signal $V_{BI}$ (A) is input to the transmitter, a signal (B) is obtained by DS spread as described above. Then, demodulation and frequency hopping are carried out, resulting in a signal (C) being transmitted from the antenna 206. The frequency hopping is carried out so that one frequency is at the same interval as one unit of base band data with respect to one cycle of hopping.

The receiver receives the signal (C) from the antenna 101.

Now, an initial synchronous supplementing process on the side of the receiver will be described hereinafter.

In FIG. 1, a forcing signal $V_S$ of a predetermined level is supplied to the clock controller 108 in association with turning-on of a power supply of the receiver. The clock controller 108 controls the clock signal generator 109 depending upon the forcing signal so that the clock signal generator 109 generates a clock signal of a frequency lower than a synchronous frequency. The PN code generator 104 supplies a PN code to the frequency synthesizer 103 in synchronism with the clock signal (E) from the clock signal generator 109. This causes a speed of frequency hopping to be delayed as compared with that on the side of the transmitter. When this condition is kept, the transmitter and receiver are coincident in phase with each other at certain time, resulting in such a peak as indicated at (F) in FIG. 3 occurring at the output signal of the correlation device 105, leading to synchronization. At this time, removal of the forcing signal $V_S$ causes the synchronous complementing to be completed.

Now, a synchronous holding process will be described hereinafter.

The signal received by the receiver, as shown in FIG. 3(C), is a time series serial signal subjected to hopping by means of the output signals $f_1$ to $f_7$ of the transmitter.

The PN code generator 104 supplies a PN code to the frequency synthesizer 103 in synchronism with a clock signal (E) generated from the clock signal generator 109. In response thereto, the frequency synthesizer 103 supplies a signal (D) to the mixer 102. The signal (C) is multiplied by the output signal (D) of the frequency synthesizer 103 by the mixer 102, resulting in a predetermined intermediate frequency signal $f_{IF}$ being generated from the mixer.

The correlation device 105 takes a correlation between the output signal of the mixer 102 and the PN code of the PN code generator 104, to thereby generate a correlation signal (F). The phase comparator 107 compares the phase of the correlation signal (F) and that of the clock signal (E) with each other, to thereby supply a signal (G) corresponding to a phase error to the controller 108. In this instance, as will be apparent from the signals (C) and (D), a timing of hopping on the side of the receiver is delayed as compared with that on the side of transmitter with respect to signals $f_1$ to $f_7$ and $f_1$ to $f_3$ at time $T_a$ and with respect to signals $(f_1+f_{IF})$ to $(f_7+f_{IF})$ and $(f_1+f_{IF})$ to $(f_3+f_{IF})$ corresponding thereto, resulting in a positive signal (G) being output. In response to the signal (G), the clock controller 108 varies a frequency of the clock signal generator 109 and carries out controlling so as to decrease a phase error. In other words, it carries out controlling so as to increase a frequency of the clock signal (E), to thereby accomplish synchronous holding. On the contrary, when the phase on the receiver is advanced as seen in signals $f_4$ to $f_7$ at time Tb of the signal (C) and signals $(f_4+f_{IF})$ to $(f_7+f_{IF})$ corresponding thereto, a level of the output signal (C) of the phase comparator 107 is inverted. In response thereto, the clock controller 108 carries out controlling so as to reduce the frequency of the clock signal (E), resulting in synchronous holding being accomplished. Repeating of the above-described process permits synchronous holding of frequency hopping between the transmitter and the receiver to be attained, so that a base band data output signal $V_{BO}$ corresponding to the base band data input signal $V_{BI}$ may be obtained.

Thus, in the illustrated embodiment, at least one frequency is subject to hopping at an interval equal to the DS signal during one cycle of frequency hopping and synchronous holding of the frequency hopping is carried out by means of the correlation device 105, to thereby eliminate a necessity of separately providing a DS synchronous circuit and an FS synchronous circuit, so that synchronization may be accomplished with a simple construction. Also, even when a certain frequency is interfered due to external noise or the like, the portion of the frequency which renders demodulation of data impossible accounts for a significantly reduced part of the frequency, resulting in improving error rate characteristics as compared with conventional low-speed hopping.

Further, in the illustrated embodiment, a cycle of changing-over of the frequency synthesizer is set to be n times (n: real number) that of the PN code and a timing of hopping is coincident with a peak of the output of the correlation device; therefore, synchronous holding can be carried out so as to permit the output signal of the correlation device 105 to be optimum, so that synchronization between both FH and DS sections may be easily accomplished. In addition, the illustrated embodiment uses The DF system and FH system in combination, accordingly, gain by processing is a product of both systems, resulting in the gain being improved as compared with the single DF or FH system.

The illustrated embodiment has been described on an example wherein seven kinds of frequencies are used for hopping and three frequencies are assigned to one unit of base band data (one data/three hoppings). However, in the present invention, it is merely required that a timing of hopping is coincident with a peak of the output of the correlation device and at least one frequency is subject to hopping at an interval equal to one cycle of the DS signal during one cycle of frequency hopping; thus, the number of frequencies with respect to one bit of base band data is not essential.

As can be seen from the foregoing, the SS communication system of the present invention is so constructed that at least one frequency is subject to hopping at an interval equal to one cycle of the DS signal during one cycle of frequency hopping and a cycle of changing-over of hopping is controlled depending upon the output signal of the correlation device, resulting in accomplishing synchronization. Thus, the synchronization is positively carried out; and, even when a certain frequency is interfered due to external noise or the like, the portion of the frequency which renders demodulation of data impossible accounts for a significantly reduced part of the frequency, resulting in improving error rate characteristics as compared with conventional low-speed hopping.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed as new and desired to be secured by Letters Patent of the United States is:

1. A transmitter for spectrum spread communication system comprising:
   a PN code generator for generating a PN code;
   a frequency synthesizer for changing over and outputting a plurality of different frequency signals in response to said PN code supplied from said PN code generator;
   a mixing means for carrying out multiplication between a base band data input signal and said PN code supplied from said PN code generator;
   means for modulating a signal supplied from an AC signal source using a signal supplied from said mixing means to convert it into a high frequency signal; and
   means for subjecting an output signal of said modulating means to frequency hopping by means of an output signal of said frequency synthesizer;
   wherein one cycle of said frequency hopping includes one frequency which is subject to hopping at an interval equal to one cycle of a direct spread signal generated from said modulating means and at least two frequencies one of which is subject to hopping at an interval equal to one cycle of the direct spread signal generated from said modulating means.

2. A transmitter for spectrum spread communication system as defined in claim 1, wherein an interval of said frequency hopping is n(n:real number) times as large as one cycle of said direct spread signal and a timing of said frequency hopping is aligned with termination of one cycle of said PN code.

3. A transmitter for spectrum spread communication system as defined in claim 1, wherein the frequency subjected to hopping at an interval equal to one cycle of the direct spread signal varies at every one cycle of the hopping.

4. A receiver for spectrum spread communication system as defined in claim 2, wherein said control means comprises a phase comparator, a clock controller and a clock signal generator, said phase comparator comparing a phase difference between a correlation signal supplied from said correlation device and a clock signal supplied from said clock signal generator to supply a signal depending upon the difference to said clock controller, said clock controller supplying a clock control signal depending upon an input signal to said clock signal generator, said clock signal generator supplying a clock signal of a frequency depending upon said clock control signal to said PN code generator and said phase comparator.

5. A receiver for spectrum spread communication system comprising:
   a PN code generator for generating a PN code;
   a frequency synthesizer for changing over and outputting a plurality of different frequency signals in response to said PN code supplied from said PN code generator;
   a mixer for carrying out multiplication between a signal received by a receiver and a signal supplied from said frequency synthesizer to generate its output signal, said signal received by said receiver being a timer series serial signal including one frequency subject to hopping at an interval equal to one unit of a base band data and at least two frequencies one of which is subject to hopping at an interval equal to one unit of the base band data;
   a correlation device for carrying out correlation between an output signal of said mixer and said PN code to generate correlation signal;
   a demodulator for demodulating a signal input thereto to generate a base band output signal; and
   means for controlling a frequency of said PN code generator in response to said correlation signal.

* * * * *